(12) United States Patent
Mason

(10) Patent No.: US 6,442,820 B1
(45) Date of Patent: Sep. 3, 2002

(54) METHOD AND APPARATUS FOR FORMING A TUBE HAVING AN ARTICLE INSERTED THEREIN

(75) Inventor: Murray R. Mason, Bolton (CA)

(73) Assignee: F & P Mfg., Inc., Tottenham (CA)

( * ) Notice: Subject to any disclaimer, the term of this patent is extended or adjusted under 35 U.S.C. 154(b) by 0 days.

(21) Appl. No.: 09/696,260

(22) Filed: Oct. 26, 2000

(51) Int. Cl.[7] .................... B23P 17/00; B21D 26/00
(52) U.S. Cl. .................... 29/421.1; 29/432; 72/55
(58) Field of Search ................ 29/421.1, 432, 29/522.1, 897.2; 72/55

(56) References Cited

U.S. PATENT DOCUMENTS

| | | | |
|---|---|---|---|
| 3,093,887 A | * 6/1963 | Prestige et al. | ............... 29/845 |
| 3,195,227 A | 7/1965 | Prestige | |
| 4,989,482 A | 2/1991 | Mason | |
| 5,022,421 A | * 6/1991 | Johnson | .................. 137/15.13 |
| 5,111,723 A | * 5/1992 | Andrusch et al. | ............... 83/24 |
| 5,133,237 A | * 7/1992 | Daffe | ........................ 83/684 |
| 5,398,533 A | 3/1995 | Shimanovski et al. | |
| 5,445,002 A | 8/1995 | Cudini et al. | |
| 5,641,176 A | 6/1997 | Alatalo | |
| 5,644,829 A | 7/1997 | Mason et al. | |
| 5,666,840 A | 9/1997 | Shah et al. | |
| 5,673,929 A | 10/1997 | Alatalo | |
| 5,737,952 A | 4/1998 | Baumann et al. | |
| 5,799,524 A | 9/1998 | Schafer et al. | |
| 5,815,901 A | 10/1998 | Mason et al. | |
| 5,816,089 A | 10/1998 | Marando | |
| 5,857,897 A | 1/1999 | Krcek et al. | |
| 5,941,112 A | * 8/1999 | Ghiran et al. | .................. 72/55 |
| 6,070,445 A | * 6/2000 | Holierhoek | .................... 72/61 |
| 6,098,437 A | 8/2000 | Kocer et al. | |
| 6,158,122 A | * 12/2000 | Skudutis | .................... 29/897.2 |
| 6,158,772 A | * 12/2000 | Skudutis | .................... 280/781 |
| 6,216,330 B1 | * 4/2001 | Valin | ........................ 29/525 |
| 6,260,393 B1 | * 7/2001 | Engel et al. | .................... 72/55 |
| 6,276,258 B1 | * 8/2001 | MacMillan et al. | ........... 92/164 |
| 6,298,701 B1 | * 10/2001 | Marando | ...................... 72/61 |
| 6,305,201 B1 | * 10/2001 | Ghiran et al. | .................. 75/55 |
| 6,341,514 B2 | * 1/2002 | Engel et al. | .................... 72/55 |
| 6,401,507 | * 6/2002 | Krcek et al. | .................... 72/55 |

* cited by examiner

*Primary Examiner*—David P. Bryant
*Assistant Examiner*—Essama Omgba
(74) *Attorney, Agent, or Firm*—Bereskin & Parr

(57) ABSTRACT

In the present invention a tubular blank and an article such as a bushing to be assembled are loaded into a die. The tube is hydroformed using typical methods and, while the blank is still pressurized, a punch pierces a hole in the tube. The punch also has an article loaded onto it and, as the punch advances, the article is pushed into the tube through the pierced hole. The punch continues to advance such that it pierces a hole in the opposite side of the tube. The punch then retracts leaving the bushing in the tube. The article may alternately be inserted by means separate from the punch.

19 Claims, 6 Drawing Sheets

METHOD AND APPARATUS FOR FORMING A TUBE HAVING AN ARTICLE INSERTED THEREIN

FIELD OF THE INVENTION

This invention relates to hydroforming a tube and, more particularly, to a forming such a tube with an article inserted therein.

BACKGROUND OF THE INVENTION

Hydroforming is well known for its ability to form an integral hollow beam with a complex shape, something which would otherwise have to be fabricated from several pieces and/or bent to shape. Typically, a round tubular blank is inserted between a pair of dies which have an internal cavity in the form of the desired exterior shape of the final part. Then the ends of the tube are plugged and the interior chamber of the tubular blank is pressurized, generally with water or hydraulic fluid, to force it into the shape of the die cavity. The completed part is then de-pressurized and removed.

The hydroformed part often, in its final application, will require that one or more holes or openings to be provided in it, a task which is sometimes accomplished by cutting or drilling after the tube is formed. It is also known, however, to pierce or cut the holes while the tube is still pressurized and held in the die or mold. For example, U.S. Pat. No. 4,989,482 to Mason discloses punching the wall of an internally pressurized tube. Similarly, U.S. Pat. No. 5,666,840 to Shah et al. discloses piercing two aligned holes in a hydroformed tube.

Once the holes are punched, functional elements such as bushings or threaded nuts often must be inserted to permit, say, a fastener to attach to the hydroformed part. Other articles may be required to be inserted. In all cases, however, once the hole(s) have been pierced (or cut, etc.), after the part is removed from the die cartridge, the bushing, etc. is inserted and then welded to the hydroformed part. While other methods of attachment are known, each method requires a separate operation after the part is hydroformed and the hole is cut. Not only do such additional cutting, fitting and welding steps add process cost and time, but also have a tendency to introduce errors such as additional dimensional variation or missed process steps, both of which can be detrimental to the function and economics of the part.

Accordingly, there is a need for an improved method and apparatus for inserting articles into hydroformed tubes which can decrease process cost and time, as well as increase the accuracy and repeatability with which mass manufactured parts are fabricated.

SUMMARY OF THE INVENTION

In a first aspect, the present invention provides 1.A method for hydroforming a tubular member comprising the steps of providing a die having a cavity therein, the cavity having an internal surface corresponding to a configuration of a desired final tubular member, providing a tubular blank; the tubular blank having an internal chamber, confining the tubular blank in the cavity, sealing the internal chamber, pressurizing the internal chamber to cause the blank to conform to the internal surface of the cavity to create the tubular member having a wall, making a hole in the wall of the tubular member while the tubular member is in the die; and inserting an article into the hole while the tubular member is in the die.

In a second aspect, the present invention provides an improved method of hydroforming a tube, the method having the steps of providing a die having a cavity therein, providing a blank having an internal chamber, confining the blank in the cavity, sealing the chamber and pressurizing the chamber to create a hydroformed tube, the tube having a wall, an improvement comprising the steps of, making a hole in the wall while the tube is confined in the die, and inserting an article at least partially into the hole while the tube is confined in the die.

In a third aspect, the present invention provides an apparatus for hydroforming a tubular member comprising a die having a cavity therein for confining a tubular member, pressurizing means for internally pressurizing the tubular member to a desired pressure, a hole-making member for making a hole in a wall of the tubular member and an article insertion member for inserting an article at least partially into the hole wherein the hole-making member is disposed in a passageway in the die, the passageway communicating with the cavity to provide the hole-making member access to the wall of a tubular member confined in the cavity, and wherein the article insertion member is disposed in a passageway in the die, the passageway communicating with the cavity to provide the article insertion member access to a hole in the tubular member while the tubular member is confined in the cavity.

BRIEF DESCRIPTION OF THE DRAWINGS

For a better understanding of the present invention, and to show more clearly how it may be carried into effect, reference will now be made by way of example to the accompanying drawings. The drawings show components made according to a preferred embodiment of the present invention, in which.

DETAILED DESCRIPTION OF THE PREFERRED EMBODIMENT

Figure 1:
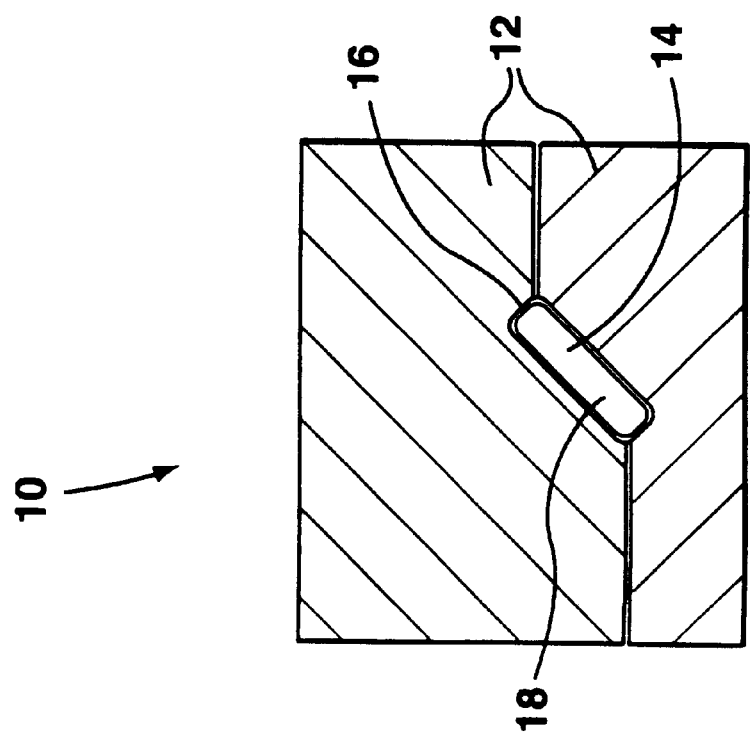
FIG. 1 is a sectional side view of a hydroforming die set according to the prior art.

Hydroforming forming presses and dies are well known in the art and thus it is necessary only to describe such equipment briefly here. Referring to FIG. 1, a hydroforming apparatus according to the prior art is shown at 10. Apparatus 10 has a pair of die halves 12 which co-operate to form an interior cavity 14 for forming a tubular blank (not shown) into a tubular member 16 having an interior chamber 18 and a desired shape molding cavity 14. Means for pressurizing the tubular blank during the process are also provided, but not shown in the Figure.

Figure 2:
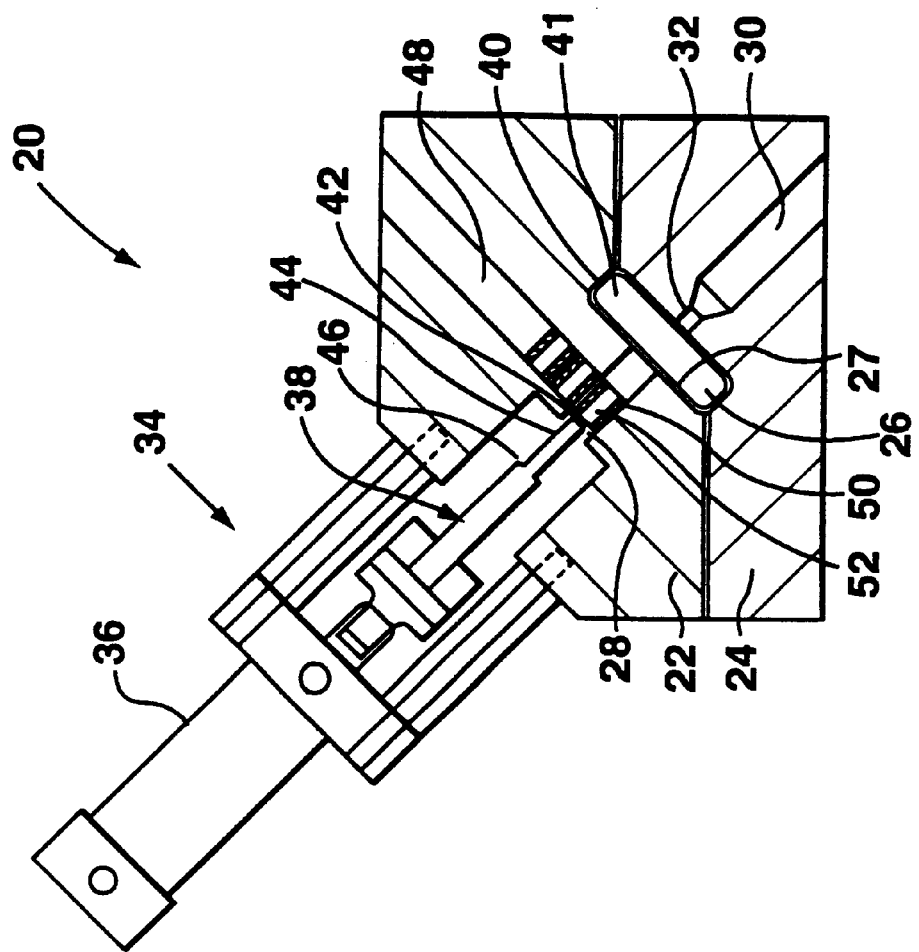
FIG. 2 is a sectional side view of the apparatus of the present invention.

Referring to FIG. 2, a hydroforming apparatus according to the present invention is shown generally at 20 and has a first die half 22 and second die half 24 which co-operate to form an interior cavity 26 having an internal surface 27.

Apparatus 20 also has a first passage 28 and a second passage 30 disposed in an aligned fashion across cavity 26. A die button 32 having a central hole is disposed at the intersection of second passage 30 and cavity 26. A punch apparatus 34 has a hydraulic or pneumatic cylinder 36 for controllably reciprocatingly actuating a hole forming apparatus, such as a punch 38, in passages 28 and 30. Punch 38 (shown in FIG. 2 in a 'withdrawn' position) is capable of forming a hole or holes in a tube or tubular member 40, having an interior chamber 41, and which is retained in cavity 26, as will be described further below. Means for sealing and controllably pressurizing a tubular blank (not shown) from which tubular member 40 is formed are also provided, but not shown in these Figures. Punch 38 has a cutting tip 42, a first shank 44 and a shoulder 46. As one skilled will understand, cutting tip 42 and die button 32 are sized to cooperate with one another to provide a hole of desired configuration in tubular blank 40.

Figure 3:
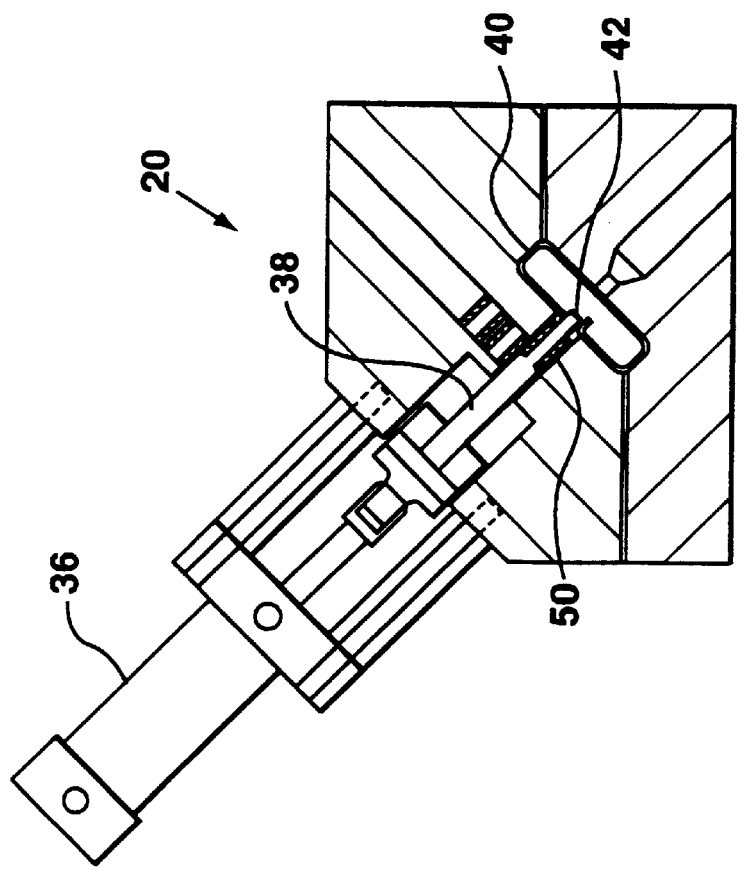
FIGS. 3–6 are sectional side views of the apparatus of FIG. 2, shown in various stages of its operation.
Figure 4:
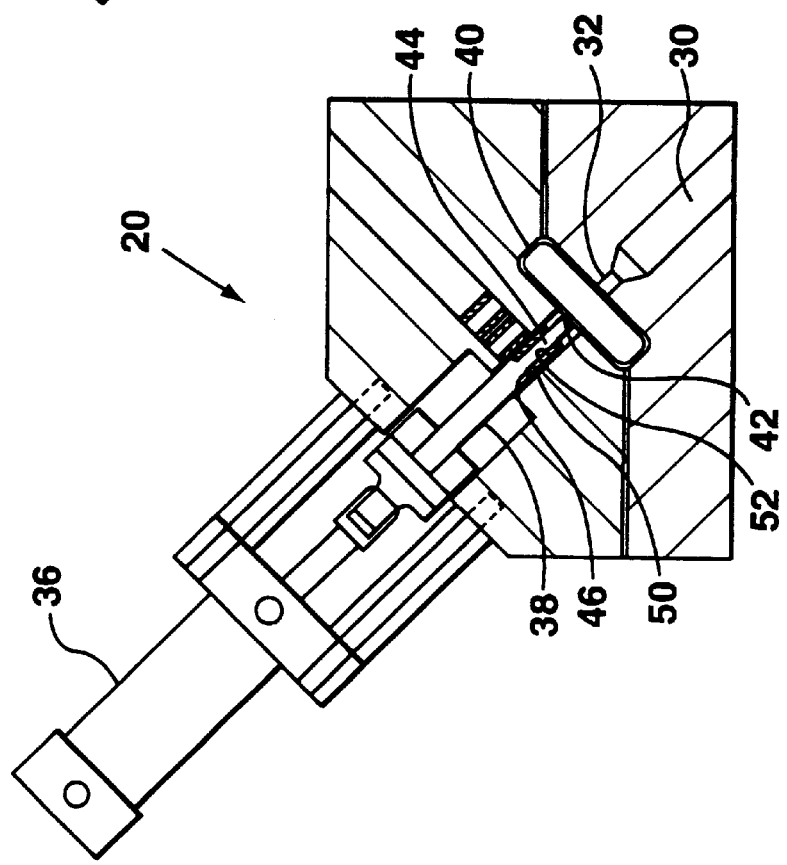

A magazine 48 is provided for supplying a plurality of articles 50 to the apparatus for insertion into a tubular blank 40 held in cavity 26. In this embodiment, article 50 comprises a collar 50 having a bore 52 therethrough. As shown in FIG. 3, first shank 44 is sized to permit punch 38 to be inserted into bore 52 of collar 50. In this position, shoulder 46 bears against collar 50. Shoulder 46 on punch 38 acts as an insertion member for the article in that, as the punch apparatus advances, shoulder 46 causes collar 50 to also advance toward, and ultimately be inserted into tubular member 40, as will be described in more detail below.

Referring again to FIG. 2, in use a tubular blank (not shown) is pressurized (by sealing and pressuring its internal chamber) and is hydroformed according to known techniques to yield a tubular member 40. Typically this process comprises placing a tubular blank (not shown) in cavity 26, with die halves 22 and 24 open, closing die halves 22 and 24 and then internally pressurizing the blank to a desired pressure so as to cause the tubular blank to assume the shape of cavity 26 to thereby yield tubular member 40.

Referring to FIG. 3, once tubular member 40 has been formed in cavity 26, punch 38 is advanced by cylinder 36 through first passage 28 to insert punch 38 into bore 52 of collar 50 and advance punch 38 until collar 50 bears against shoulder 46. Punch 38 is further advanced through first passage 28, thereby also advancing collar 50 through passage 28.

Figure 6:
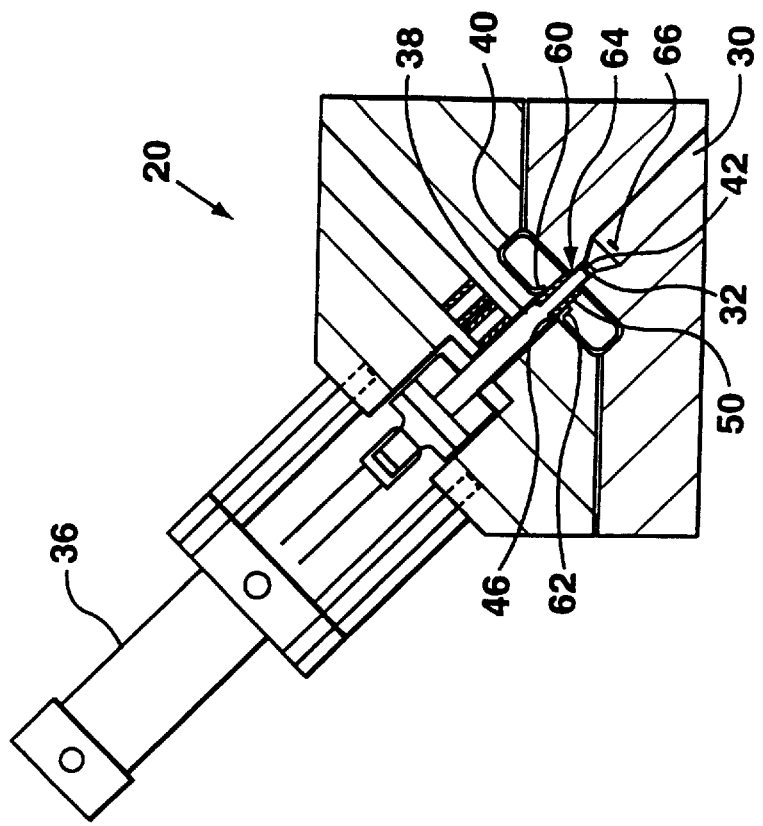
Figure 5:
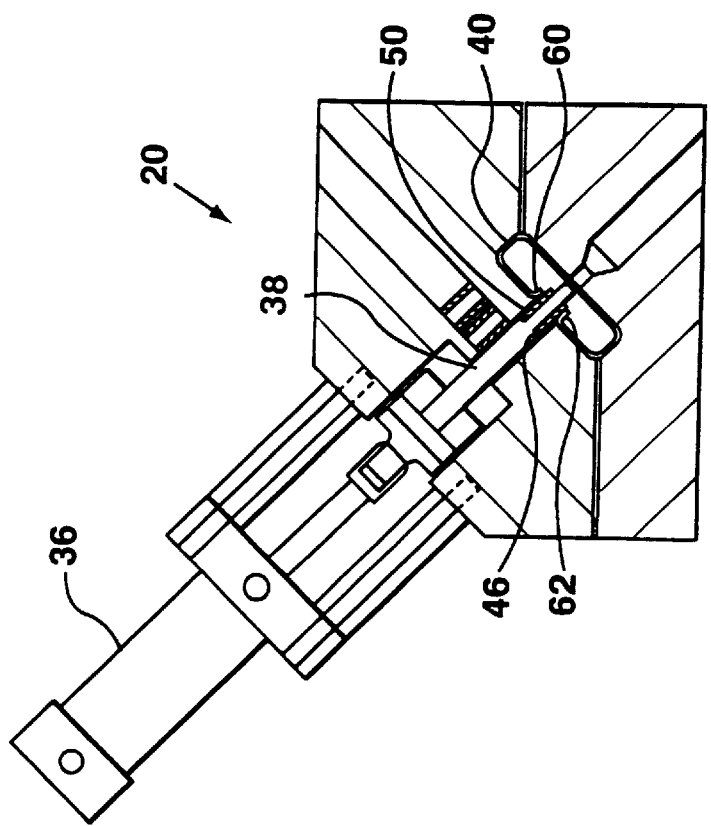

Referring to FIGS. 3–6, as punch 38 is progressively advanced, cutting tip 42 contacts the wall of tubular member 40 (FIG. 3), then cutting tip 42 pierces the wall of tubular member 40 to make a first hole 60 (FIG. 4), then collar 50 engages the edges of first hole 60 and widens first hole 60 by partially extruding the edges to create flanges 62 as collar 50 is inserted into first hole 60 (FIG. 5), and then cutting tip 42 contacts and pierces a second hole 64 in the wall of tubular member 40 (FIG. 6). A pair of slugs 66, created by the punching of first hole 60 and second hole 64 is ejected through die button 32 and through second passage 30. As shown in FIG. 6, punch 38 is advanced until collar 50 is preferably fully inserted into interior chamber 41 of tubular member 40, such that the leading edge of collar 50 abuts the surface of the wall of tubular member 40. Punch 38 is then returned to its withdrawn position (FIG. 2) and the die is opened to yield the part.

Figure 9:
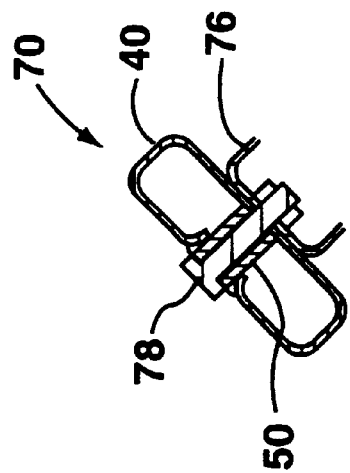
FIG. 7–9 are sectional side views of a part made according to the present invention.
Figure 8:
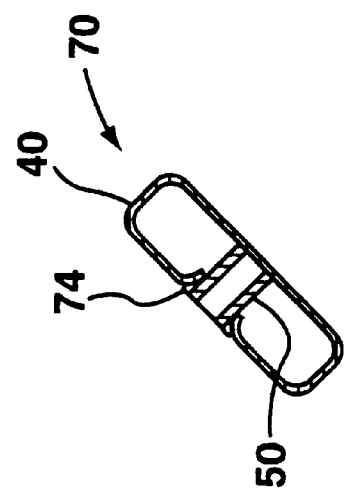
Figure 7:
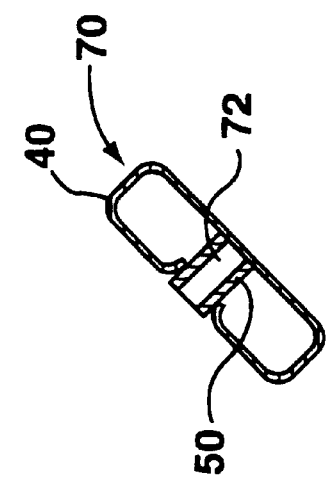

Referring to FIG. 7, a part 70 formed in accordance with the above invention has a tubular member 40 and collar 50 inserted therein. Holes 60 and 64 cooperate with bore 52 in collar 50 to offer a complete through-hole 72 through the part. As one skilled in the art will appreciate, flanges 62 tend to retain collar 50 by a press-fit within the part. Part 70 may be used in this state as a component in a further assembly, or more preferably is enhanced by a weld 74 (FIG. 8) between collar 50 and at least one side. The part 70 may then be fastened to another workpiece 76 (see FIG. 9) by means of a fastener 78, such as a bolt and nut.

Figure 10:
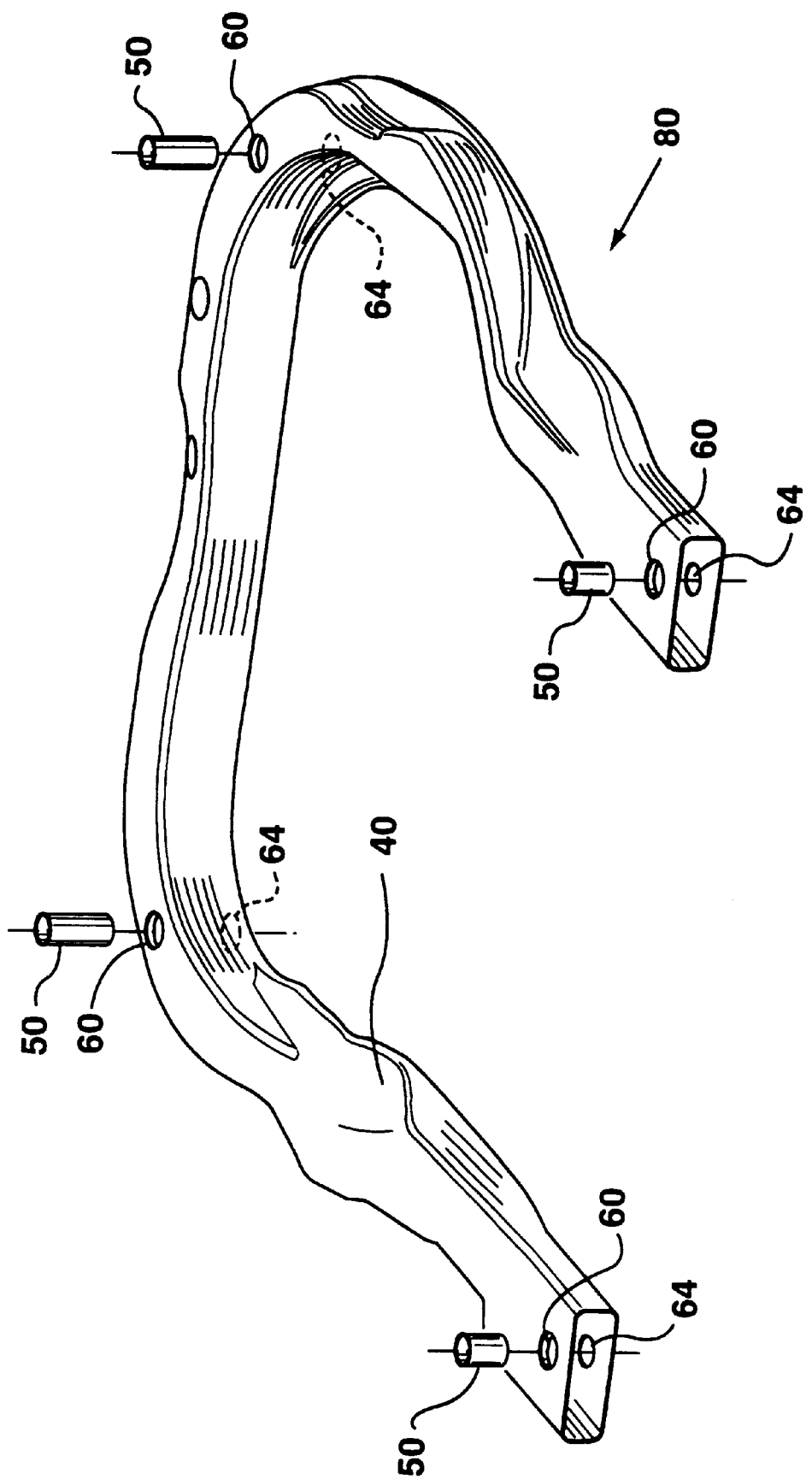
FIG. 10 is an exploded isometric view of an automotive sub-frame made in accordance with the present invention.

The present invention may be used in forming structural components of almost any description. Referring to FIG. 10, a portion of an automobile subframe assembly is shown at 80, which comprises a tubular member 40 having a plurality of collars 50 for mounting subframe assembly 80 to the automotive body (not shown). Collars 50 are inserted at multiple locations subframe assembly 80 in accordance with the present invention. Preferably, a plurality of punch apparatuses 34 are provided on apparatus 20 for subframe 80, one at each location a collar 50 is required. It is desirable to have all such punch apparatuses operate simultaneously, since once a first punch pierces the part, the internal pressure in the tube may be released.

While the above description constitutes the preferred embodiment, it will be appreciated that the present invention is susceptible to modification and change without departing from the fair meaning of the accompanying claims.

Figure 11:
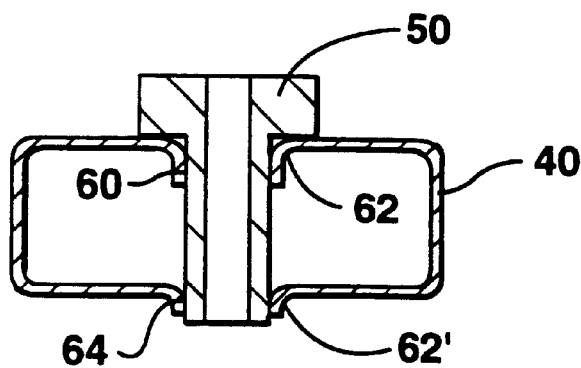
FIGS. 11–13 are enlarged side views of parts made in accordance with alternate embodiments of the present invention.
Figure 12:
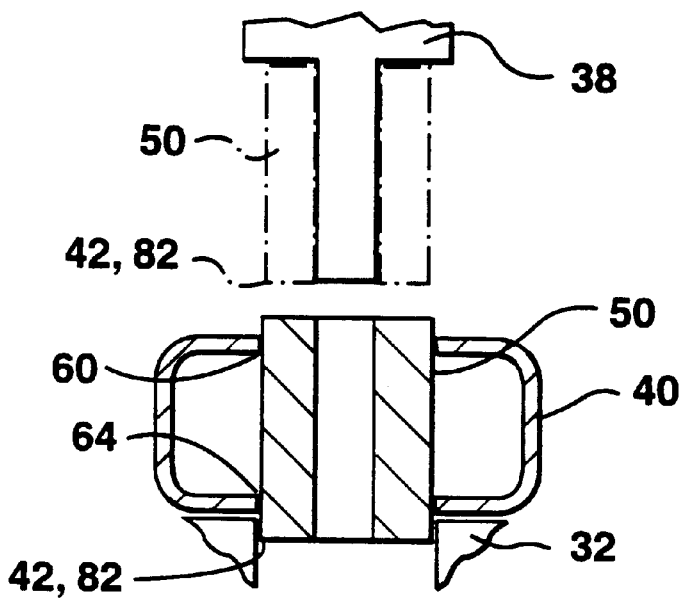
Figure 13:
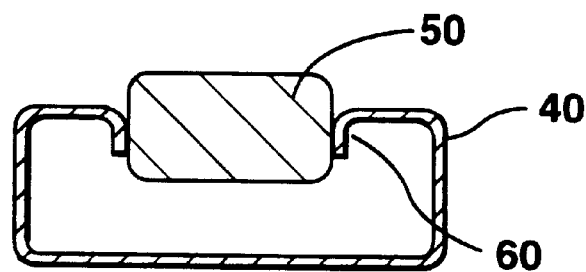

For example, apparatus 20 may be modified to fully insert collar 50 through first hole 60 and second hole 64, as shown in FIG. 11. Referring to FIG. 12, punch 38 and die button 32 can be modified to provide flangeless first and second holes 60, 64. In this embodiment, it will be understood that a leading edge 82 of collar 50 acts, in effect, as cutting tip 42 in forming holes 60 and 64. (In FIG. 12, collar 50 is shown both in a phantom position, prior to piercing and insertion, and in its fully inserted position). Referring to FIG. 13, only one hole 60 is formed and a different article, such as a threaded nut 50, is inserted. Other articles may also be inserted, such as pierce nuts and bushings. Still other articles may be inserted, with generally cylindrical articles being preferred, but not required.

One skilled in the art will recognize that the holes 60 and 64 need not be formed by a punch but may be formed by other suitable means, such as drilling, laser cutting or other known means.

The present invention may be employed with any known hydroforming technique, and may be used equally with low-pressure and high-pressure hydroforming. It will be understood that the particular means of hydroforming tubular member 40 is not important to the present invention and, further, that the tubular member need not be formed at all in the cavity, but rather its initial shape may be maintained. Non-cylindrical blanks may also be used.

It will be understood that, while it is preferable to operatively associate the insertion of the article with the forming of the hole(s) in tube 40, that the insertion of the article need not be so associated, and may be accomplished by other means. For example, means (not shown) may be provided in second passage 30 for inserting an article into one or more of holes 60 and 64 in tube 40.

Still other modifications may be apparent to those skilled in the art but these are not intended to depart from the scope of the appended claims. It will be understood in the claims that the step of pressurizing the internal chamber of the blank may be performed either before or after the step of confining the blank in the die cavity.

I claim:

1. A method for hydroforming a tubular member comprising the steps of:

(a) providing a die having a cavity therein, said cavity having an internal surface corresponding to a configuration of a desired final tubular member;

(b) providing a tubular blank, said tubular blank having an internal chamber;

(c) confining said tubular blank in said cavity;

(d) sealing said internal chamber;

(e) pressurizing said internal chamber to cause said blank to conform to said internal surface of said cavity to create said tubular member having a wall;

(f) making a hole in said wall of said tubular member while said tubular member is in said die and while maintaining the wall under internal pressure; and (g) inserting an article into said hole while said tubular member is in said die and while maintaining the wall under internal pressure.

2. The method of claim 1 wherein said hole is made by a punch.

3. The method of claim 2 wherein said punch is positionable between a withdrawn position and an inserted position, a portion of said punch being inserted through said hole in said wall when said punch is in said inserted position, and wherein said punch includes an article insertion member wherein said article insertion member is adapted to receive said article when said punch is in said withdrawn position, and wherein said article insertion member is capable of engaging said article and inserting said article in said hole when said punch is advanced from said withdrawn position to said inserted position.

4. The method of claim 1 further comprising the step of making a second hole in said wall of said tubular member.

5. The method of claim 4 further comprising the step of inserting said article at least partially into said second hole.

6. The method of claim 1 wherein said article has a bore therethrough.

7. The method of claim 6 wherein said article is selected from a group consisting of bushings, collars and nuts.

8. The method of claim 1 wherein said article is press-fitted into said hole.

9. In a method of hydroforming a tube, the method having the steps of providing a die having a cavity therein, providing a blank having an internal chamber, confining the blank in the cavity, sealing the chamber and pressurizing the chamber to create a hydroformed tube, said tube having a wall, the improvement being a method for inserting an article having a bore therethrough into said tube comprising the steps of:

(a) inserting a hole-making member through the bore of the article;

(b) making at least one hole in said wall by pushing the hole-making member against the wall while said tube is confined in said die while maintaining the wall under internal pressure; and (c) inserting the article at least partially into said at least one hole while said tube is confined in said die and while maintaining the wall under internal pressure.

10. The method of claim 9, wherein said hole is made by a punch, said punch having a cutting tip.

11. The method of claim 10 wherein said punch is positionable in a passageway in said die and is moveable between a withdrawn position and an inserted position, a portion of said punch being inserted through said hole in said wall when said punch is in said inserted position, and wherein said punch includes an article insertion member, wherein said article insertion member is adapted to receive said article when said punch is in said withdrawn position, and wherein said article insertion member is capable of engaging said article and inserting said article in said hole when said punch is advanced from said withdrawn position to said inserted position along said passageway.

12. The method of claim 9, wherein said said step of making at least one hole comprises the step of making a first hole in a first side of the wall and a second hole in a second side of the wall, wherein the second side is opposite the first side, and the second hole is aligned with the first hole.

13. The method of claim 12 wherein the article is inserted into the first hole, through the internal cavity, and into the second hole.

14. An apparatus for hydroforming a tubular member comprising;

(a) a die having a cavity therein for confining a tubular member;

(b) pressurizing means for internally pressurizing said tubular member to a desired pressure;

(c) an article insertion member for inserting an article into the tubular member while the member remains under pressure, wherein the insertion member includes a hole-making portion for making a hole in a wall of said tubular member and an article engaging portion for engaging an article and advancing the article at least partially into said hole;

wherein said hole-making portion and article engaging portion are disposed in a passageway in said die, said passageway communicating with said cavity to provide said hole-making portion access to said wall of said tubular member confined in said cavity, said passageway communicating with said cavity to provide said article engaging portion access to said hole in said tubular member while said tubular member is confined in said cavity.

15. The apparatus of claim 14 wherein said article has a bore therethrough, and said hole-making portion is a punch comprising a shank having a diameter sized to fit through said bore.

16. The apparatus of claim 15 wherein said article engaging portion comprises a shoulder portion having a diameter greater than the diameter of said shank for pushing said article into said hole created by said punch.

17. The apparatus of claim 15 wherein said article is selected from a group consisting of bushings, collars and nuts.

18. The apparatus of claim 14 wherein said punch is positionable in said passageway between a withdrawn position and an inserted position, a portion of said punch being inserted through said hole in said wall when said punch is in said inserted position, wherein said article insertion member engages said article when said punch is in said withdrawn position, and wherein said article insertion member is capable of advancing said article in said hole when said punch is advanced from said withdrawn position to said inserted position.

19. The apparatus of claim 14 wherein said hole-making portion is capable of making a second hole in said wall and advancing said article into the second hole.

* * * * *